United States Patent [19]
Prout et al.

[11] Patent Number: 5,104,198
[45] Date of Patent: Apr. 14, 1992

[54] BLOW-MOLDED WHEEL WITH HEAVY-DUTY AXLE BORE AND ROLL-OUT WASTE CONTAINER WITH HEAVY-DUTY BLOW-MOLDED WHEEL

[75] Inventors: John T. Prout, Winston-Salem; Billy R. Cagle, Mooresville, both of N.C.

[73] Assignee: Toter, Inc., Statesville, N.C.

[21] Appl. No.: 549,368

[22] Filed: Jul. 6, 1990

[51] Int. Cl.⁵ .......................... B60B 3/12; B60B 5/02
[52] U.S. Cl. .......................... 301/63 PW; 301/64 SH
[58] Field of Search ......... 301/63 PW, 63 DD, 64 R, 301/64 SH, 5 R; 152/323

[56] References Cited

U.S. PATENT DOCUMENTS

| | | | |
|---|---|---|---|
| 1,102,193 | 6/1914 | Horn et al. | 301/64 SH |
| 1,420,337 | 6/1922 | Palmer | 301/63 DD |
| 1,470,742 | 10/1923 | Ibach | 301/64 SH |
| 1,586,425 | 5/1926 | Goodyear | 301/63 DD X |
| 1,599,845 | 9/1926 | Shoemaker | 301/63 DD |
| 2,629,420 | 2/1953 | Walklet | 301/63 DD X |
| 3,977,454 | 8/1976 | Coran et al. | 301/63 PW X |
| 4,444,435 | 4/1984 | Honsa | 301/63 PW |
| 4,674,759 | 6/1987 | Parker | 301/63 PW X |

FOREIGN PATENT DOCUMENTS

| | | | |
|---|---|---|---|
| 219469 | 4/1957 | Australia | 301/63 DD |
| 13859 | of 1899 | United Kingdom | 301/64 SH |

Primary Examiner—Russell D. Stormer
Attorney, Agent, or Firm—W. Thad Adams, III

[57] ABSTRACT

A heavy-duty, wear resistant, blow-molded plastic wheel comprising first and second integrally-formed wheel sides defined by alternating axially spaced-apart and joined side segments. A solid center core portion surrounds a central axle bore. The wheel also includes an integrally-formed, axially-extending tread, and molded, integrally-formed axle bore support means in the first and second wheel sides radially-outwardly adjacent of the axle bore and diagonally extending between the first and the second wheel sides to provide enhanced support to the axle bore.

22 Claims, 3 Drawing Sheets

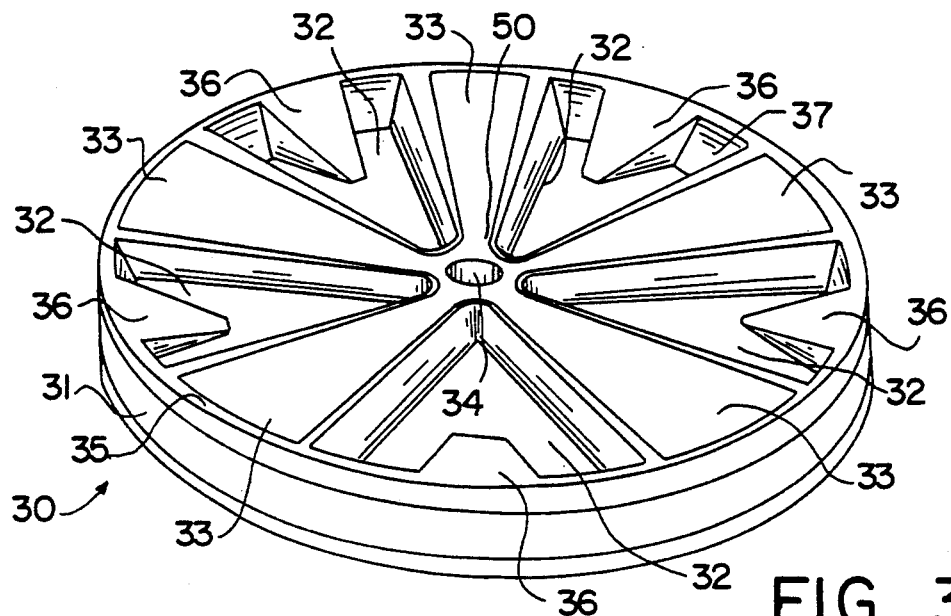
FIG. 3
FIG. 4
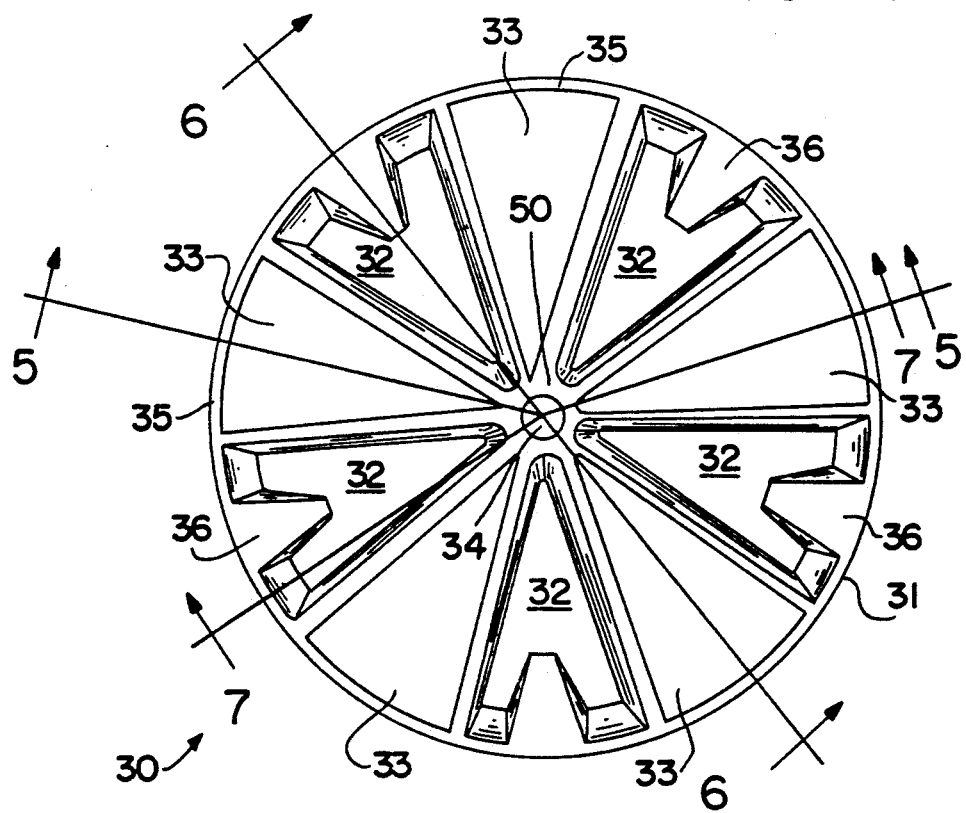

BLOW-MOLDED WHEEL WITH HEAVY-DUTY AXLE BORE AND ROLL-OUT WASTE CONTAINER WITH HEAVY-DUTY BLOW-MOLDED WHEEL

TECHNICAL FIELD AND BACKGROUND OF THE INVENTION

This invention relates to a heavy duty blow molded wheel adaptable for many purposes but described in this application for particular use with a roll-out waste container of the type commonly used by waste haulers and municipalities for "street-side" waste collection.

One-piece molded plastic wheels are known in the prior art. However, prior art wheels are designed to resemble older-type pneumatic or semi-pneumatic wheels. Generally, this means that the side wall and tread portions of the plastic wheel are designed to resemble the rubber tire portion of a pneumatic or semi-pneumatic wheel, included a rounded tread area and a rounded, relatively thick width side wall.

There are, of course, reasons why a pneumatic tire has a rounded tread and side wall cross-section. Since the tire is filled with pressurized air, the tire will naturally want to assume a rounded cross-section since the air is pressing with equal force on all interior parts of the tire. Furthermore, since a pneumatic tire is designed to compress under weight and to absorb and cushion irregularities in the rolling surface, a relatively thick width side wall is required so that the tire will not be compressed to the point where the tread bottoms out on the wheel rim under heavy impact or weight loads. In other words, the side wall needs to be relatively thick and compressible to take full advantage of the benefits offered by pneumatic and semi-pneumatic rubber tires.

Likewise, the axle bore of a pneumatic or semi-pneumatic tire generally comprises a steel sleeve or similar structure inserted into the wheel and, in any event, is cushioned from extreme shock by the highly compressible nature of the tire itself.

These considerations to not apply in the use of plastic wheels. Plastic wheels are relatively stiff and brittle in comparison to rubber tires. Of course, plastic wheels are not pneumatic. They are generally used in situations where loads are not great, and on relatively even surfaces where it is not necessary to cushion impact on the wheel, for example on roll-out waste containers.

However, roll-out waste containers are becoming larger and are designed to carry much heavier loads. For these reasons, conventionally designed plastic wheels are now subject to crushing due to heavy loads placed on them. This crushing usually occurs in the side-wall area and/or in the area of the axle bore, both of which have a relatively thin cross-sectional dimensions in prior art wheels. Since the side wall area is generally perpendicular, or normal, to the direction of load application, the side walls are caused to bulge out under load and the axle bore will crush or wallow out. The relatively brittle plastic is not designed to flex to any substantial degree, and for this reason the side wall and the axle bore area breaks down, damaging the wheel and eventually requiring replacement. The axle bore in prior art wheels has a relatively open, unsupported core structure which is subject to stress and eventual wear and breakage. The axle bore area is generally supported only adjacent its opposite ends, with a void between the opposing side walls of the wheel around the bore area.

Of course, the cross-sectional thickness of the core area of the axle bore can be made progressively greater to withstand heavier loads. However, this increases the expense and weight of the wheel.

It has been discovered that a wheel which will withstand heavy-duty loads without damage can be made using no more or even less material by supporting the axle bore with integrally formed, adjacent core structures within the radius of the wheel itself.

SUMMARY OF THE INVENTION

Therefore, it is an object of the invention to provide a heavy-duty blow-molded wheel having a heavy duty axle bore.

It is another object of the invention to provide a heavy-duty blow-molded wheel which has a side wall cross-sectional thickness which is relatively large in relation to its width.

These and other objects of the present invention are achieved in the preferred embodiments disclosed below by providing a heavy-duty, blow-molded plastic wheel comprising first and second integrally-formed wheel sides defined by alternating axially spaced-apart and joined side segments. A solid center core surrounds a central axle bore. The wheel also includes an integrally-formed, axially-extending tread, and molded, integrally-formed axle bore support means in the first and second wheel sides radially-outwardly adjacent of the axle bore and diagonally extending between the first and the second wheel sides to provide enhanced support to the core area of the axle bore and to the axle bore itself.

According to one preferred embodiment of the invention, the first and second wheel sides include a plurality of radially-outwardly extending, spaced-apart spokes.

According to another preferred embodiment of the invention, the wheel includes a plurality of integrally-formed and spaced-apart stiffening lugs adjacent the side wall and projecting inwardly towards the axle-bore.

According to yet another preferred embodiment of the invention, the side wall has a width no greater than one-sixth the width of the tread.

Preferably, the side wall is approximately one-quarter inch (6 mm) in width and the radial thickness of the solid center core of the wheel surrounding the axle bore is approximately one-eighth inch (3 mm).

According to one preferred embodiment of the invention, the wheel includes five outwardly-extending, relatively thick spokes separated by five web portions of reduced thickness.

According to another preferred embodiment of the invention, the wheel includes a five integrally-formed and spaced-apart stiffening lugs adjacent the side wall and projecting inwardly towards the axle bore in alternate web portions.

According to yet another preferred embodiment of the axle bore support means comprise diagonally extending walls converging away from the axle bore adjacent opposite sides of the wheel to form the joined side segments.

According to one preferred embodiment of the invention, the support means walls converge at approximately 45°.

According to another preferred embodiment of the invention, the first and second wheel sides surrounding the axle bore defines an enclosed hollow area.

According to yet another preferred embodiment of the invention, the side wall and the tread define an enclosed hollow area and wherein the first and second wheel sides surrounding the axle bore defines an enclosed hollow area, each of the hollow areas being generally triangular in cross-section.

According to yet other preferred embodiments of the invention, the other features of the blow-molded wheel as described above are combined with the roll-out cart.

Brief Description of the Drawings

Some of the objects of the invention have been set forth above. Other objects and advantages of the invention will appear as the invention proceeds when taken in conjunction with the following drawings, in which:

FIG. 3 is a perspective view of the blow-molded wheel according to an embodiment of the invention;

FIG. 4 is a plan view of the blow molded wheel shown in FIG. 3;

DESCRIPTION OF THE PREFERRED EMBODIMENT AND BEST MODE

Figure 1:
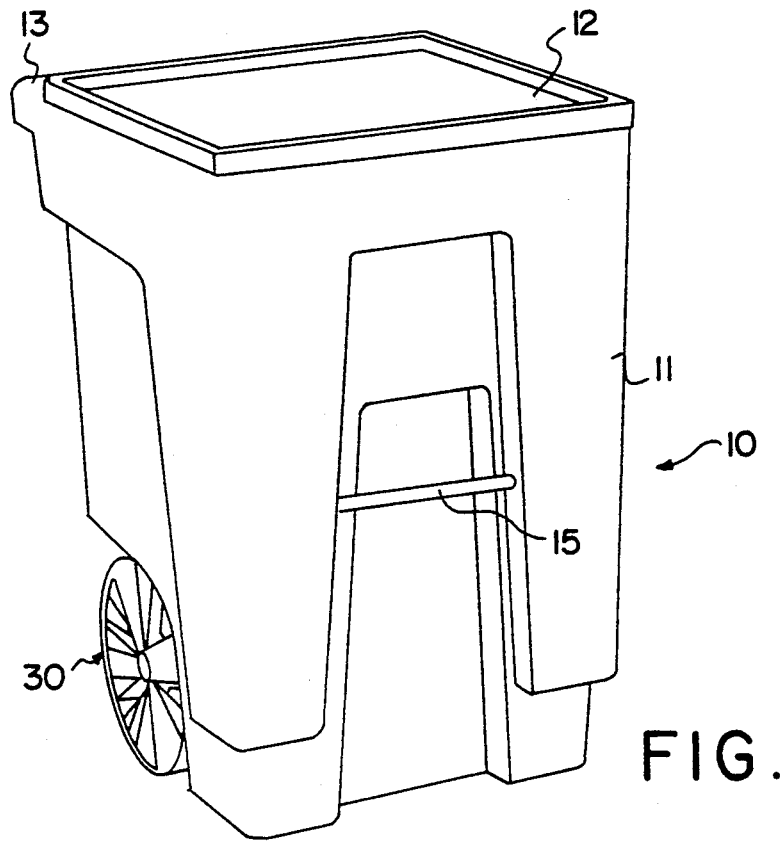
FIGS. 1 and 2 are roll-out type waste containers having a blow-molded wheel according to an embodiment of the invention mounted thereon.
Figure 2:
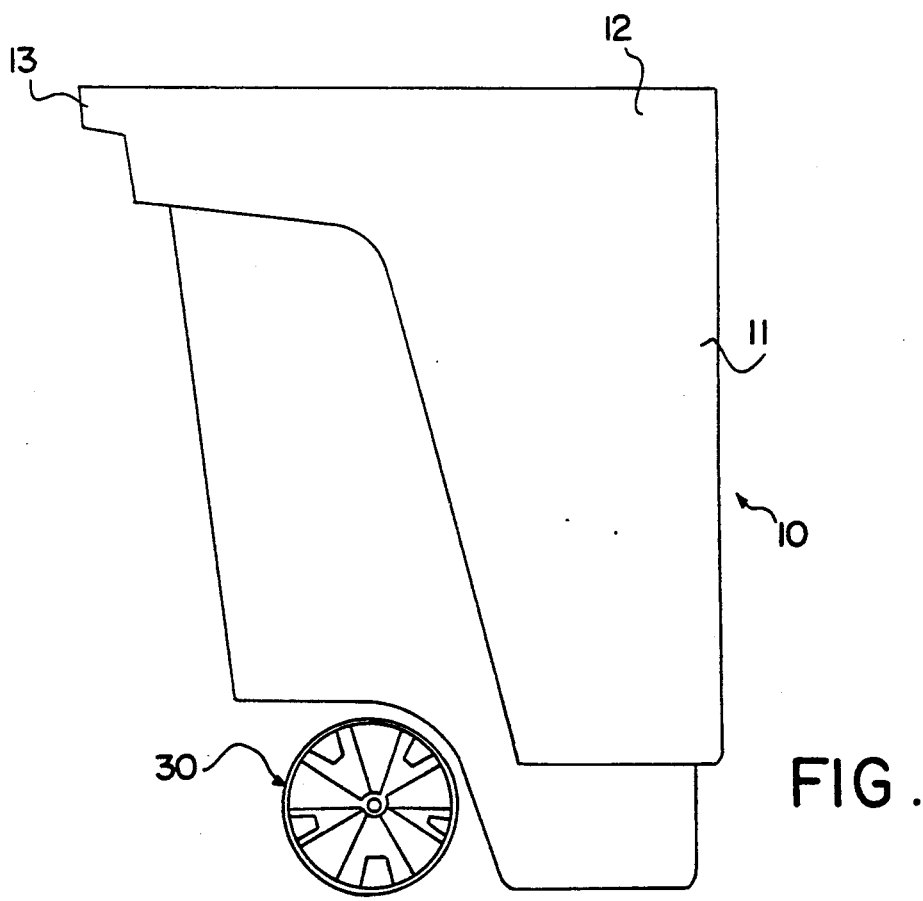

Referring now specifically to the drawings, a roll-out type waste container mounted with blow-molded wheels according to the present invention is illustrated in FIGS. 1 and 2, and shown generally at reference numeral 10. Container 10 has a container body 11 with a top opening 12. The container 10 is maneuvered by a handle 13 molded into the container 10, and as is shown in FIG. 1, a lifting bar 15 which cooperates with a lifting hook carried on a lifting mechanism of the type usually carried by a waste collection vehicle.

Figure 5:
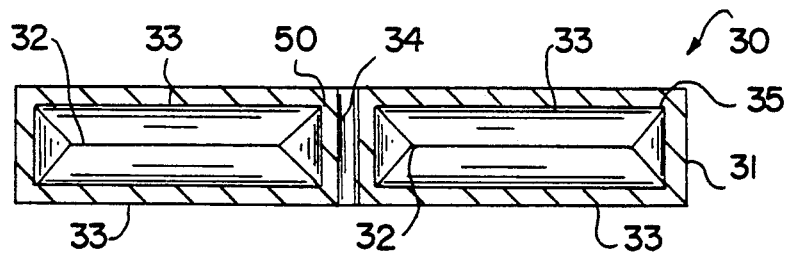
FIG. 5 is a cross-section of the wheel shown in FIGS. 3 and taken substantially along lines 5—5 of FIG. 4.

Container 10 is mounted on a pair of wheels 30 according to the present invention. Referring now to FIGS. 3-5, the wheel 30 is illustrated. Wheel 30 is blow-molded of high molecular weight polyethylene of a type particularly suited for blow molding. Wheel 30 is blow-molded in a single, integrally-formed piece with a part line (not shown) extending around the periphery of the wheel 30 equidistant the two side-edges of a tread 31. The term tread is used even though the rolling surface of the tread 31 is relatively smooth. If desired, some form of texture could be imparted to the tread 31.

Wheel 30 according to the particular design shown in the drawings has five single thickness webs 32 alternating with five relatively thick hollow spokes 33, converging on the center core of wheel 30 and forming a solid core 50 through the axis of the wheel 30 from one side to the other. An axle bore 34 is formed in core 50. The spokes diverge to define the tread 31 and a narrow width side wall 35 which extends around the periphery of wheel 30 in a plane substantially parallel to the plane of webs 32 and spokes 33, and normal to the plane of the tread 31.

Stiffening lugs 36 are molded into the webs 32 to provide stiffening re-enforcement to wheel 30. Preferably, the blow pin is inserted through one of the stiffening lugs 36. Both sides of wheel 30 are structurally and visually the same. Axle supports 38 converge diagonally in the areas where the webs 32 are joined.

The dimensions referred to below are for a ten inch (25 cm) diameter wheel 30 having a five-eights inch (16 mm) axle bore 34. The thickness of the core 50 defining the axle bore opening 34 between the opposing wheel sides is approximately one-eighth to three-sixteenths inch (3-5 mm). Of course this dimension is variable depending on the diameter and thickness of the wheel and other variables. The spokes 33 have a height above the adjacent webs 32 of three-quarters inch (19 mm).

Referring more specifically to the side wall 35, the width of the side wall 35 is quite small in comparison with the thickness of its cross-section, and also quite small in comparison with the width of the tread 31. See FIGS. 5 and 6, which also shows the cross-sectional geometry of the wheel.

For example, in a conventional rubber tire or molded plastic wheel the width of the side wall may be equal to or greater than the width of the tread. In contrast, in the wheel 30 according to the preferred embodiment shown in the drawings, side wall 35 has a width of only one-quarter inch (6 mm), whereas the width of the tread 31 is one and three-quarters inches (44 mm). In other words, the width of the side wall 35 is only about one-seventh the width of the tread 31.

Figure 6:
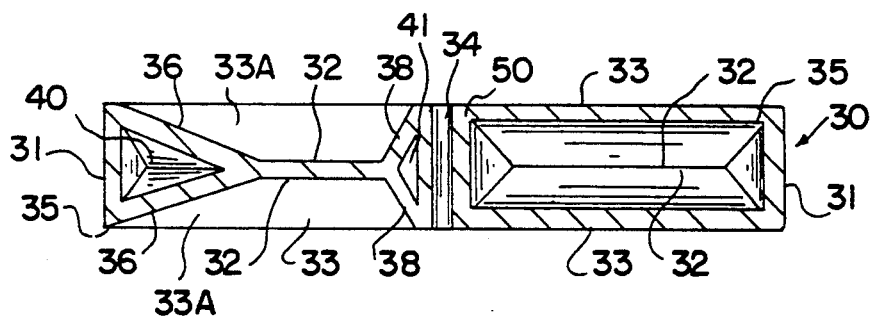
FIGS. 6 and 7 are cross-sections of the wheel shown in FIGS. 3 and 4 taken substantially along lines 6—6 and 7—7, respectively, of FIG. 4.
Figure 7:
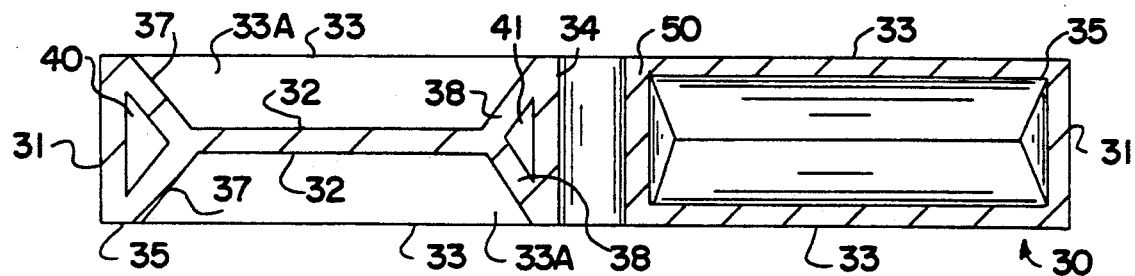

As is best shown in FIG. 6, the webs 32 are formed by pinching together the opposing wheel sides. In these areas—there are five spaced around the wheel—triangular reenforcements are formed. The sides 33A of the spokes 33 converge, each leaving a first triangular void 40 adjacent the tread 31 and a smaller triangular void 41 adjacent the core 50 and axle bore 34. The sides 33A of the spokes 33 are angled in such a way so that in cross-section the sides 33A are at about 45 to the axis of the axle bore 34. This diagonal shape forms five cantilever-type stiffening supports which greatly spread the forces acting on the core 50 surrounding axle bore 34. Thus, greatly increased strength and resistance to damage and wear is achieved with little or no additional material.

While variations are possible depending on the geometry of the wheel, the material from which the wheel is molded and the like, it is believed that highly improved wear and resistance to crushing due to loading can be achieved by limiting the width of the side wall to no more than one-fourth the width of the tread. For example, in a wheel having a two inch (50 mm) wide tread, the side wall should preferably be about one-quarter inch (6 mm) wide and preferably no more than about one-half inch (12 mm) wide.

The cross-sectional thickness of the side wall portion of wheel 30 is approximately one-eighth inch (3 mm). A change in the diameter of the wheel 30 would require a proportional change in the dimensions set out above, but not in the ratios of side wall width and tread width described above.

A heavy-duty blow-molded wheel and a roll-out type waste container mounted on a heavy duty blow-molded wheel are described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A heavy-duty integrally formed wear resistant, blow-molded plastic wheel comprising:
   (a) an integrally-formed circular web defining a central axle bore;
   (b) two radially extending peripheral side walls having a plurality of axially spaced-apart spokes alternating with a plurality of axially-joined webs of increased pressure resistance extending radially outwardly from adjacent the axle bore;
   (c) an axially extending tread integrally formed with said side walls and connecting said side walls round the peripheral edge of the wheel;
   (d) an integrally-formed, axially-extending tread, and molded, integrally-formed axle bore support means in said first and second wheel sides radially-outwardly adjacent to said axle bore and diagonally extending between said first and the second wheel sides to provide enhanced support to said axle bore.

2. A heavy-duty blow-molded wheel according to claim 1, wherein said first and second wheel sides include a plurality of radially-outwardly extending, spaced-apart spokes.

3. A heavy-duty blow-molded wheel according to claim 2, wherein said axle bore support means comprise diagonally extending walls converging away from aid axle bore adjacent opposite sides of said wheel to form said joined side segments.

4. A heavy-duty blow-molded wheel according to claim 1, wherein said wheel includes a plurality of integrally-formed and spaced-apart stiffening lugs adjacent said side wall and projecting inwardly towards the axle-bore.

5. A heavy-duty blow-molded wheel according to claim 1, wherein said side wall has a width no greater than one-sixth the width of the tread.

6. A heavy-duty blow-molded wheel according to claim 1 or 5, wherein said side wall is approximately one-quarter inch (6 mm) in width and the radial thickness of the solid center core of the wheel surrounding the axle bore is approximately one-eighth inch (3 mm).

7. A heavy-duty blow-molded wheel according to claim 1 or 5, wherein said wheel includes five outwardly-extending, relatively thick spokes separated by five web portions of reduced thickness.

8. A heavy-duty blow-molded wheel according to claim 7, wherein said wheel includes a five integrally-formed and spaced-apart stiffening lugs adjacent said side wall and projecting inwardly towards the axle bore in alternate web portions.

9. A heavy-duty blow-molded wheel according to claim 1 or 5, wherein said side walls converge at approximately 45°.

10. A heavy-duty blow-molded wheel according to claim 1 or 5, wherein the first and second wheel sides surrounding said axle bore defines an enclosed hollow area.

11. A heavy-duty blow-molded wheel according to claim 1 or 5, wherein said side wall and said tread define an enclosed hollow area and wherein said first and second wheel sides surrounding said axle bore defines an enclosed hollow area, each of said hollow areas being generally triangular in cross-section.

12. In a roll-out type, plastic waste container having a waste-receiving container body, a handle, lifting means and wheel-mounting means, the combination therewith of a heavy-duty, wear resistant, blow-molded plastic wheel mounted on said wheel-mounting means and comprising:
   (a) an integrally-formed circular web defining a central axle bore;
   (b) two radially extending peripheral side walls having a plurality of axially spaced-apart spokes alternating with a plurality of axially-joined webs of increased pressure resistance extending radially outwardly from adjacent the axle bore;
   (c) an axially extending tread integrally formed with said side walls and connecting said side walls around the peripheral edge of the wheel;
   (d) an integrally-formed, axially-extending tread, and molded, integrally-formed axle bore support means in said first and second wheel sides radially-outwardly adjacent of said axle bore and diagonally extending between said first and the second wheel sides to provide enhanced support to said axle bore.

13. In a roll-out type, plastic water container according to claim 12, wherein said first and second wheel sides include a plurality of radially-outwardly extending, spaced-apart spokes.

14. In a roll-out type, plastic water container according to claim 13, wherein said axle bore support means comprise diagonally extending walls converging away from said axle bore adjacent opposite sides of said wheel to form said joined side segments.

15. In a roll-out type, plastic water container according to 12, wherein said wheel includes a plurality of integrally-formed and spaced-apart stiffening lugs adjacent said side wall and projecting inwardly towards the axle-bore.

16. In a roll-out type, plastic water container according to claim 12, wherein said side wall has a width no greater than one-sixth the width of the tread.

17. In a roll-out type, plastic water container according to claim 12 or 16, wherein said side wall is approximately one-quarter inch (6 mm) in width and the radial thickness of the solid center core of the wheel surrounding the axle bore is approximately one-eighth inch (3 mm).

18. In a roll-out type, plastic water container according to claim 12 or 16, wherein said wheel includes five outwardly-extending, relatively thick spokes separated by five web portions of reduced thickness.

19. In a roll-out type, plastic water container according to claim 18, wherein said wheel includes a five integrally-formed and spaced-apart stiffening lugs adjacent said side wall and projecting inwardly towards the axle bore in alternate web portions.

20. In a roll-out type, plastic water container according to claim 12 or 16, wherein said support means walls converge at approximately 45°.

21. In a roll-out type, plastic water container according to claim 12 or 16, wherein the first and second wheel sides surrounding said axle bore defines an enclosed hollow area.

22. In a roll-out type, plastic water container according to claim 12 or 16, wherein said side wall and said tread define an enclosed hollow area and wherein said first and second wheel sides surrounding said axle bore defines an enclosed hollow area, each of said hollow areas being generally triangular in cross-section.

* * * * *